United States Patent [19]
Keefe et al.

[11] Patent Number: 6,005,921
[45] Date of Patent: Dec. 21, 1999

[54] TELEPHONE RINGBACK TEST DEVICE AND METHOD

[75] Inventors: David W. Keefe, Simi Valley; Joseph E. Barron, Newbury Park, both of Calif.; Jeffrey W. Hearsey, Brooksville, Fla.; Michael Kennedy, Ventura; Roy L. Soto, Moorpark, both of Calif.

[73] Assignee: Harris Corporation, Melbourne, Fla.

[21] Appl. No.: 08/919,511

[22] Filed: Aug. 28, 1997

Related U.S. Application Data

[63] Continuation of application No. 08/770,056, Dec. 19, 1996, abandoned.

[51] Int. Cl.[6] .............................. H04M 1/24; H04M 17/00
[52] U.S. Cl. .................................. 379/27; 379/22; 379/1; 379/142
[58] Field of Search ............................. 379/1, 9, 10, 15, 379/22, 30, 32, 34, 142, 156, 201

[56] References Cited

U.S. PATENT DOCUMENTS

| | | | |
|---|---|---|---|
| 2,502,592 | 8/1950 | Wronke | 379/21 |
| 3,727,003 | 4/1973 | Parasekevakos | 379/142 |
| 4,764,949 | 8/1988 | Faith et al. | 379/22 |
| 4,777,645 | 10/1988 | Faith et al. | 379/22 |
| 5,361,298 | 11/1994 | Ruel et al. | 379/18 |

*Primary Examiner*—Paul Loomis
*Attorney, Agent, or Firm*—Rogers & Killeen

[57] ABSTRACT

A device and method for testing a telephone circuit in which a caller takes advantage of available caller identification information to complete a ringback test without resort to potentially costly and overused toll trunks. The ringback test device is accessed by a caller (subscriber or craftsperson) who may not be aware of the telephone number from which he is calling when the caller completes a call to a telephone number assigned to the device. As the caller is accessing the test device, the test device detects the caller identification available between the first and second rings to identify the caller's telephone number, and answers the call after the second ring. The test device presents the telephone number to the caller, and the test device may thereafter be used to complete a ringback test to the identified telephone number. The caller ID information may also be display-formatted at the test device and provided to a caller's visual display.

43 Claims, 2 Drawing Sheets

TELEPHONE RINGBACK TEST DEVICE AND METHOD

This is a continuation, of application Ser. No. 08/770,056, filed on Dec. 19, 1996, now abandoned.

BACKGROUND OF THE INVENTION

The present invention is directed to methods and devices for testing telephone circuits, and more particularly to a method and device for testing a public switched telephone network (PSTN) circuit in which a caller relies on caller identification (hereinafter "caller ID") information available through the telephone system to complete a ringback test to the caller.

With reference to FIG. 1, ringback testing devices are known in the art as means for testing a PSTN circuit. By using such a device 10, a subscriber or craftsperson (both are hereinafter referred to as a "caller") with telephone handset 12 or test set 14 may test the circuit by having the caller's telephone number called from another part of the circuit after the caller goes on hook: this is known as a ringback test. Ringback tests verify continuity and operation of dial-up lines between the telephone central office 16 and the caller 12 or 14. They provide a relatively complete test of a circuit from the caller's connection, through the PSTN circuit, including office equipment in the telephone central office 16 capable of providing telephone service ("OE" in the figures), and back to the caller's connection. Ringback tests may also be conducted of circuits in customer premises equipment (CPE) and references herein to tests of circuits in public switched telephone networks include tests of CPE circuits, and tests from one CPE to another CPE.

One ringback test device is described in U.S. Pat. No. 4,764,949 issued Aug. 18, 1988 to Faith, et al., and assigned to the assignee hereof, that is incorporated by reference. One of the problems solved by the device described therein is the method by which the caller's telephone number is obtained so that the ringback test may be completed. Callers, such as craftspersons working on a telephone line with a butt-in test set and telephone installers, may not know the telephone number associated with the particular wire on which they are working. As suggested by Faith, et al., the telephone number may be obtained when the caller calls a prescribed ringback access code that accesses the ringback test device 10 at the telephone central office. Upon receipt of the ringback access code, the device 10 signals a specialized trunk facility 18 within the telephone central office 16, known as a toll trunk or outgoing trunk circuit, causing it to transmit a message that identifies the caller's telephone number. The number is stored at the ringback test device 10 and the caller is thereafter instructed to disconnect from the circuit (go on hook). When the caller is disconnected the test device 10 sends a signal to the central station 16 instructing it to dial the stored telephone number. The test is successful if the caller's telephone rings. However, there are some problems with this method in that the use of toll trunks may be costly and the toll trunks may not always be available for testing. Further, the test unit is located at the central office, and thus is available only when the central office is equipped with the test device. It is desirable to have a portable ringback tester that can be used when a tester is not installed at the central office, or to avoid toll charges that may be associated with use of someone else's (e.g., the phone company) tester.

Accordingly, it is an object of the present invention to provide a novel method and system for capturing a caller's telephone number for a ringback test that obviates the problems of the prior art.

It is another object of the present invention to provide a novel method and system for using caller ID information to conduct tests of a circuit in a telephone network.

Caller ID is a service available to subscribers in telephone systems incorporating the out-of-band signaling system protocol Signal System 7 (SS7). The caller ID service in its current embodiment provides the caller's telephone number, time of call, caller's name, and other information in a signal that is transmitted from the central office to a called subscriber during the three second silent interval between the first and second rings of the called subscriber's telephone. The caller ID information is transmitted conventionally through the telephone network in a standard serial binary format with an asynchronous frequency-shift keying (FSK) modem-like transmitter. With an appropriate receiver, the caller ID information may be displayed to the called subscriber so that the called subscriber may determine who is making the call before going off hook to answer the call. Subscribers may elect not to have their caller ID information transmitted by adding a privacy indicator (e.g., the letter "P") to the caller ID information, such as when a telephone number is "unlisted". If the caller ID information is not available, as when the caller ID service is not provided or when the caller is out-of-area (such as may be applicable to CPE caller ID systems), an out-of-area/unavailable indicator may be provided (e.a., the letter "O") instead of the caller ID information. Additional information about caller ID is available in Bellcore Technical Reference TR-TSY-000031, Issue 3, January 1990 (Bellcore, Morristown, N.J.) that is incorporated by reference.

It is still another object of the present invention to provide a novel method and test device for conducting tests of a telephone circuit in which caller ID provides a caller's telephone number and/or name and a ringback test is conducted without resort to a specialized trunk facility.

It is yet another object of the present invention to provide a novel portable test device that takes advantage of caller ID services to conduct telephone network tests, including ringback tests, tests of caller ID features such as the privacy and out-of-area indications, and tests connections to other numbers.

It is a further object of the present invention to provide a novel telephone circuit test device that takes advantage of caller ID services to conduct telephone circuit tests, and that includes the ability to receive manually entered telephone numbers from a caller.

It is still a further object of the present invention to provide a novel telephone circuit test device in which caller ID information is provided to a visual display device for conducting telephone circuit tests.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
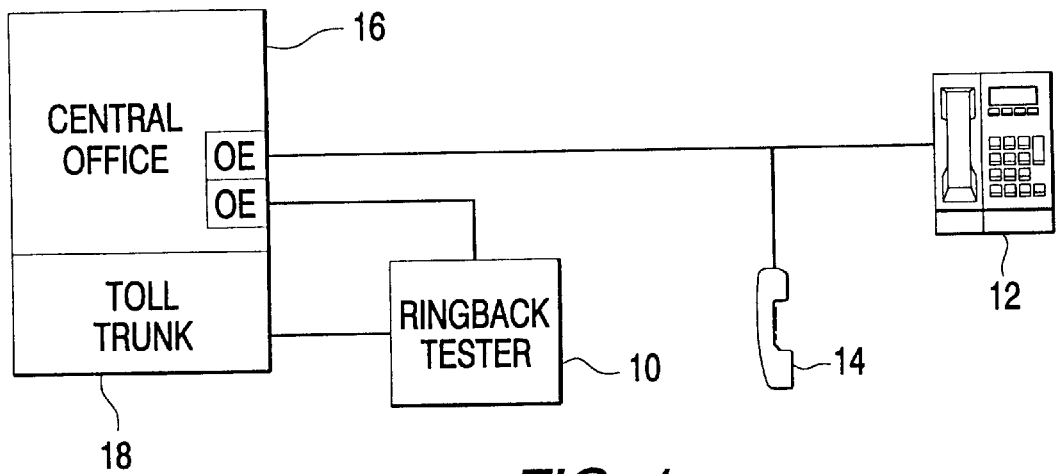
FIG. 1 is a pictorial depiction of a portion of typical telephone network with a ringback tester at the central office.
Figure 2:
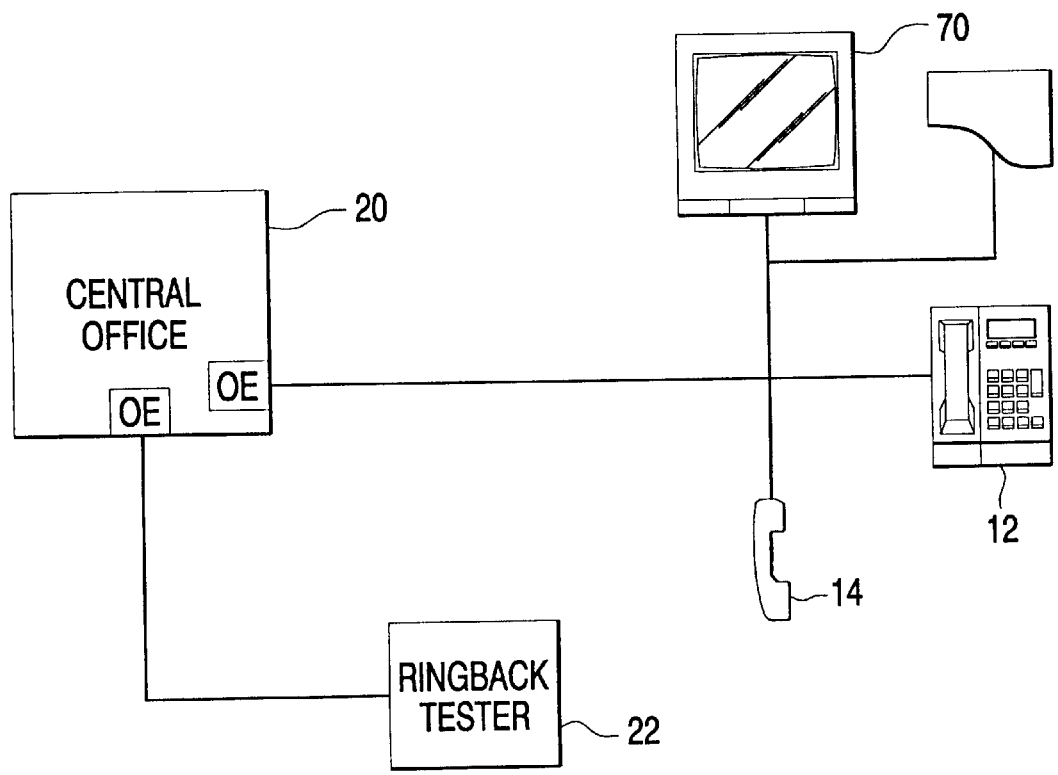
FIG. 2 is a pictorial depiction of an embodiment of a telephone circuit with the ringback tester of the present invention.

With reference now to FIG. 2, an embodiment of the present invention may include a caller's telephone 12 or 14 connected to a telephone central office 20 through a telephone network, and a test device 22. The test device 22 may be installed in an equipment bay at a telephone central station, or may be portable and connected to the telephone network with a standard telephone connection. The test device 22 is assigned a telephone number so that it becomes a subscriber in the telephone network. In contrast to the prior art, the test device 22 need not access specialized trunk facilities in the central office, but instead takes advantage of the caller ID information available from the telephone system to obtain the caller's telephone number.

Operation of the device begins when a call is originated from the caller's telephone 12 or 14 to the telephone number assigned to the test device 22. When the call has been switched to the device 22, the device 22 detects the caller ID information that is currently being provided between the first and second rings. After the second ring the device 22 goes off hook to complete the connection to the caller's telephone. If the device 22 has detected the caller ID information, it stores the telephone number identified in the caller ID and provides the number to the caller, such as by using a voice synthesizer to "speak" the identified telephone number so that it may be heard by the caller. After transmission of the telephone number, the caller may be instructed to go on hook so that the device 22 can call the identified telephone number to perform a ringback test. The device 22 completes the call to the caller by automatically dialing the stored telephone number using the normal telephone network lines.

Figure 3:
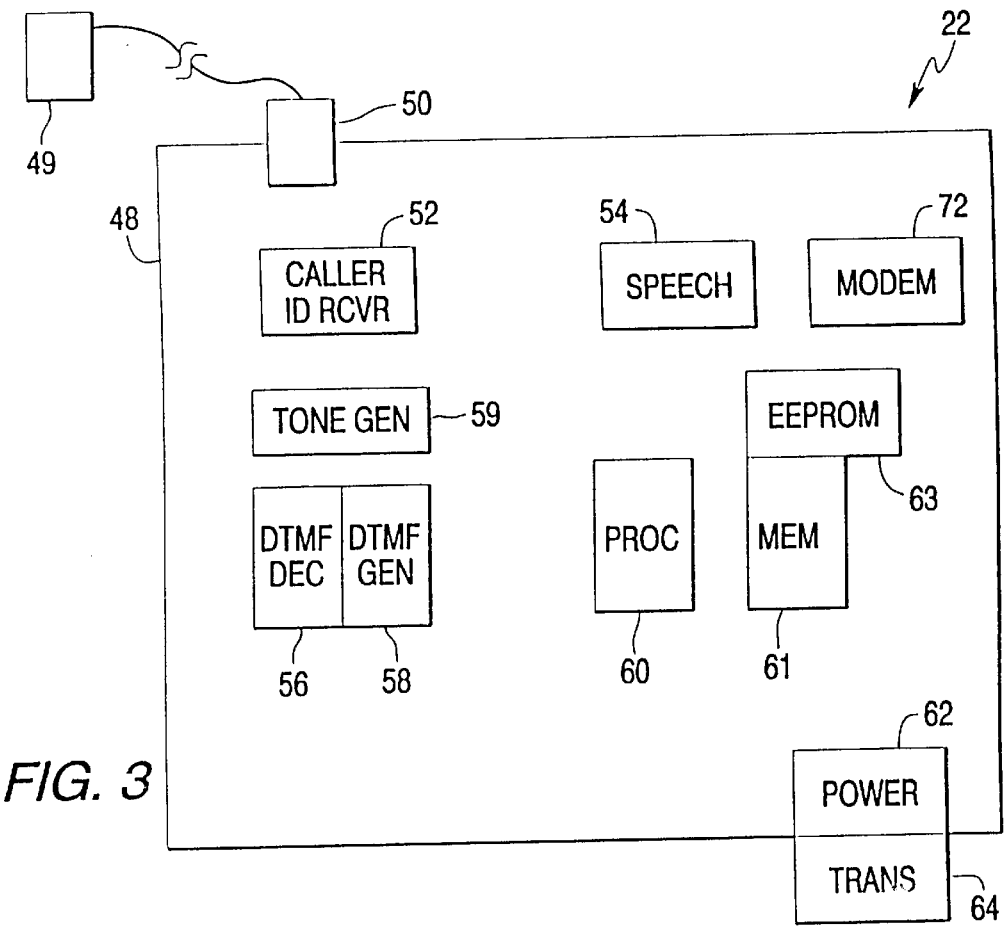
FIG. 3 is a pictorial depiction of an embodiment of the ringback tester of the present invention.

With reference now to FIG. 3, an embodiment of the test device 22 may be assembled in a single unit, such as printed circuit board (PCB) 48. The device 22 may be connected to a telephone network loop start POTS (plain old telephone service) line 49 configured to support caller ID; for the portable model a 2-wire interface 50, such as an RJ-11 phone jack, may be provided, and for the equipment bay installation, a PCS edge connector with pins for tip and ring, battery, and ground (51 in FIG. 4) may be provided. The caller ID information may be detected with a caller ID receiver 52, such as the Bell 202, Bell 103, or Bell 212A. A digital speech synthesizer 54 may provide vocal instructions to a caller, and may include a speech library of numbers and words that may be retrieved and transmitted on command. For example, the library may include the numbers 0–9, and the words "enter", "password", "number", "phone", "hang", "up", "user", and "administrator", and the entries may be combined to form messages of appropriate length, for example up to 20 seconds. DTMF decoder 56 and DTMF generator 58 may be provided for conventional telephone functions. A tone generator 59 may also be provided to generate further specific tones that may be used by a craftsperson in conducting further tests (e.g., a 1200Hz "mark" tone and a 2200Hz "space" tone, although such tones need not be limited to the 4KHz voice band).

A processor 60 and memory 61 may be provided for control and storage. The memory 61 may store the telephone number and/or name identified in the caller ID information, and may also store other information from caller ID information that the caller may selectively retrieve. The memory 61 may also store numbers entered manually by the caller from the caller's telephone so it can call other telephone numbers at the discretion of the caller, or may be used in further tests as described below.

Figure 4:
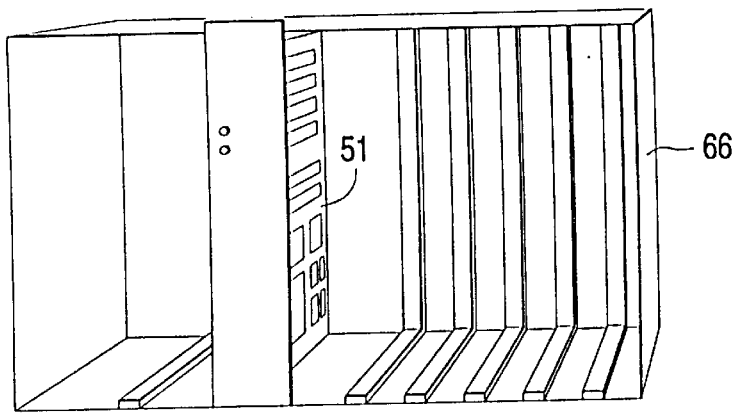
FIG. 4 is a pictorial depiction of a ringback tester of the present invention installed in a central station equipment bay.
Figure 5:
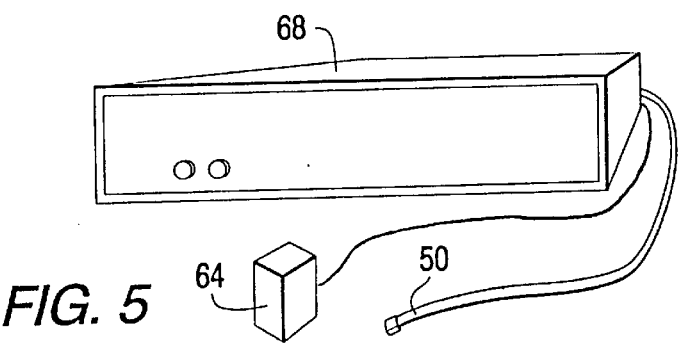
FIG. 5 is a pictorial depiction of a portable ringback tester of the present invention.

A power receptacle 62 may be provided to receive power from the central office (nominally 48 volts dc), or from an external source (such as 110 volts ac) for which a transformer 64 may be used to convert the external power to an appropriate voltage, such as 9 volts dc. The device 22 may be carried in an equipment bay 66 at a central station such as illustrated in FIG. 4, and to this end may be configured for slidable insertion. Alternatively, the device 22 may be in a container 68, such as illustrated in FIG. 5, that may be portable and have standard connections to an available source of power (for example, standard house power, or a portable generator) and to a telephone network, such as with a hardwire or through mobile systems. The portable container 68 may be operated at a site where telephones are being installed.

In a further embodiment, the caller may be provided with a visual display device 70 (FIG. 2), such as a video screen, printer, or data terminal, for viewing display-formatted caller ID information. The tester 22 may be provided with a data terminal, such as modem 72, for providing appropriately formatted caller ID information so that the caller's telephone number, name, etc. may be displayed instead of, or in addition to, being provided by the speech synthesizer 54. This capability may be particularly useful when a large number of ringback tests are being conducted and a record of such tests is desired. The tester 22 may also be adapted to provide a menu of tests that may be displayed and/or selected using display device 70.

A craftsperson using the test device 22 may perform a myriad of tests. As discussed above, the device will perform a ringback test without using special trunks. As is also apparent, it may be used to check caller ID by verifying that caller ID provides the correct telephone number (in the event the caller's telephone number is known), or to validate a craftperson's dispatch trouble ticket information relative to the subscriber's telephone number. The device can also be used to verify that caller ID is properly coded for unlisted telephone numbers. A craftsman may call the test device using an unlisted number and will not receive the unlisted telephone number if the caller ID information is coded correctly. For example, a spoken message may indicate that the caller ID is privacy coded. If the craftsperson thereafter wants to complete a ringback test of an unlisted number, the craftsperson may enter the unlisted number manually (the manually entered number may be stored in memory 61) and instruct the device to ring the number entered. Further, the device 22 may be used to verify that the caller is receiving caller ID information properly. The device may be instructed to provide tones (e.g., modem tones) that duplicate caller ID tones so that the craftsperson can perform tests on the caller's equipment to verify correct operation. The tests may also be conducted using the modem 72 and the display device 70.

In operation, access to the test device 22 may be limited by using a password. For example, when the device 22 is called, it may ask for a password such as by speaking "enter password". The caller may enter the password (e.a., a sequence of DTMF entries) for access to the device. The password may be stored in EEPROM memory 63 and retained in the event of power loss. Upon gaining access to the device, the device may speak the caller's telephone number. In the event, the caller ID information was not obtained (such as when caller ID service is not available or there has been a malfunction), the caller may be instructed to enter the caller's telephone number. Thereafter, the device 22 may recite a menu of further options for use by the craftsperson. For example, the device may offer a ringback test by pressing "1", a 1200Hz mark tone by pressing "2", a 2200Hz space tone by pressing "3", or a combination of mark and space tones by pressing "4". If the ringback option is selected, the device will instruct the caller to "hang up". After a predetermined period of time, five seconds for example, the device calls the stored number. If the number is busy, the device may wait a period of time, ten seconds for example, and call again. If the caller's telephone is not busy, the device may wait for a set number of rings or set period of time, five rings or 30 seconds for example, before ending its attempts to complete the ringback test. In a further option, the caller may manually enter a telephone number of another telephone for a ringback test of that telephone.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a ringback testing device for testing a telephone network circuit by rinsing a caller's telephone, the improvement comprising a receiver for detecting the caller's telephone number in caller ID information transmitted in a telephone network when a call is made from the caller's telephone.

2. The improvement of claim 1 further comprising a speech synthesizer for vocalizing the caller's telephone number obtained from the caller ID information so that a caller may hear the caller's telephone number.

3. The improvement of claim 1 further comprising a memory for storing the caller's telephone number obtained from the caller ID information, and means for calling the stored telephone number after the caller goes on hook to conduct a ringback test.

4. The improvement of claim 1 further comprising a modem for providing display-formatted caller ID information to the caller's telephone number for visual display.

5. The improvement of claim 1 wherein said receiver detects the caller's name in the caller ID information.

6. A device for testing a telephone circuit comprising:
   means for obtaining a caller's telephone number from caller ID information available from a telephone facility when the caller is switched into a telephone circuit;
   storage means for storing the caller's telephone number obtained from the caller ID information;
   means for instructing the caller to disconnect from the circuit when the caller's telephone number has been stored; and
   means for automatically calling the stored telephone number from the device when the caller is disconnected from the circuit so that a ringback test to the caller's telephone number can be completed.

7. The device of claim 6 wherein said means for obtaining comprises an FSK modem receiver.

8. The device of claim 6 wherein said means for obtaining comprises means for obtaining a caller's name when available in caller ID information.

9. The device of claim 6 wherein said means for instructing comprises a data terminal for providing instructions that are formatted for visual display.

10. A method of testing a telephone circuit comprising the steps of:
    (a) detecting caller ID information when a caller is switched to a testing device in the telephone circuit, the caller ID information including the caller's telephone number;
    (b) storing the detected telephone number in the testing device; and
    (c) automatically calling the stored telephone number from the testing device when the caller goes on hook.

11. The method of claim 10 further comprising the step of selectively providing from the testing device one or both of mark and space tones for testing the caller's telephone.

12. The method of claim 10 further comprising the step of providing the testing device with a connection to a source of power and a connection to the telephone circuit so that the testing device is portable.

13. A method of testing a telephone network circuit comprising the steps of:
    (a) calling from a caller's telephone in a telephone network a telephone number assigned to a test device in the telephone network;
    (b) detecting at the test device the telephone number in caller ID information provided by the telephone network when the test device is switched to the caller's telephone;
    (c) storing the detected telephone number at the test device;
    (d) providing the detected telephone number to the caller;
    (e) instructing the caller to go on hook when the detected telephone number has been stored; and
    (f) calling the stored telephone number from the test device.

14. The method of claim 13 wherein the caller's telephone is a craftspersons butt-in test set.

15. The method of claim 13 further comprising the step of requiring the caller to provide a password before the step of providing the detected telephone number.

16. The method of claim 13 wherein the step of providing the detected telephone number to the caller is limited to caller's telephone numbers that are not privacy coded.

17. The method of claim 13 further comprising the steps of manually entering a telephone number of a second telephone for storage in the test device, and thereafter calling the stored second telephone number to conduct a ringback test of the second telephone.

18. The method of claim 13 further comprising the steps of detecting at the test device the name in the caller ID information, providing the detected name to the caller.

19. In a ringback testing device for testing a telephone network circuit in a telephone network by ringing a caller's telephone, the improvement comprising a receiver for detecting the caller's telephone number in caller ID information transmitted in the telephone network without the use of a toll trunk when a call is made from the caller's telephone.

20. The improvement of claim 19 further comprising a speech synthesizer for vocalizing the caller's telephone number obtained from the caller ID information so that a caller may hear the caller's telephone number.

21. The improvement of claim 19 further comprising a memory for storing the caller's telephone number obtained from the caller ID information, and means for calling the stored telephone number after the caller goes on hook to conduct a ringback test.

22. The improvement of claim 19 further comprising a modem for providing display-formatted caller ID information to the caller's telephone number for visual display.

23. The improvement of claim 19 wherein said receiver detects the caller's name in the caller ID information.

24. A method of testing a telephone circuit in a telephone network comprising the steps of:
(a) detecting caller ID information when a caller is switched to a testing device in the telephone circuit without the use of a toll trunk of the telephone network, the caller ID information including the caller's telephone number;
(b) storing the detected telephone number in the testing device; and
(c) automatically calling the stored telephone number from the testing device when the caller goes on hook.

25. The method of claim 24 further comprising the step of vocalizing the detected telephone number obtained from the caller ID information so that the caller may hear the detected telephone number.

26. The method of claim 24 further comprising the step of selectively providing from the testing device one or both of mark and space tones for testing the caller's telephone.

27. The method of claim 24 further comprising the step of providing the testing device with a connection to a source of power and a connection to the telephone circuit so that the testing device is portable.

28. A system for testing a telephone loop and providing status information to a loop subscriber source comprising:
the loop subscriber source having a path to a telephone network for establishing the telephone loop;
a specialized maintenance device coupled to the loop subscriber source for initiating testing and communicating status information; and
an autonomous device positioned as a subscriber in the telephone network for establishing the telephone loop; the autonomous device being selectively responsive to the specialized maintenance device; the autonomous device automatically extracting, storing, and communicating status information on the source when testing is initiated by the specialized maintenance device;
wherein the specialized maintenance device and autonomous device exercise loop communications from the source to the autonomous device and from the autonomous device to the source.

29. The system of claim 28 wherein the specialized maintenance device initiates testing by ringing the autonomous device.

30. The system of claim 29 wherein the autonomous device extracts status information from a ring signal which is for ringing the autonomous device.

31. The system of claim 30 wherein the ring signal includes status information.

32. The system of claim 28 wherein the status information includes a telephonic address for the loop subscriber source.

33. The system of claim 28 wherein the autonomous device and the specialized maintenance device exercise loop communications by performing a ringback test.

34. The system of claim 33 wherein the specialized maintenance device rings the autonomous device and, after initially indicating an off-hook state, the autonomous device automatically rings the specialized maintenance device using extracted status information.

35. The system of claim 34 wherein the status information is extracted from a ring signal initiated to ring the autonomous device.

36. The system of claim 28 wherein the autonomous device selectively provides one or both of mark and space tones.

37. The system of claim 28 wherein the wide area telephone network comprises a central office.

38. The system of claim 28 wherein the wide area telephone network comprises a plurality of central offices.

39. The system of claim 28 wherein the autonomous device converts stored status information to a dialing signal for automatically calling the specialized maintenance device in response to being ringed by the specialized maintenance device.

40. The system of claim 28 wherein the specialized maintenance device and the autonomous device are portable.

41. A remote caller identification system for providing a caller with the caller's own subscriber information comprising an automated subscriber apparatus positioned in the caller's telephone network which is ringed by the caller; the apparatus extracting the caller's subscriber information from the ring signal and communicating the subscriber information to the caller.

42. The remote caller identification system of claim 41 wherein the automated subscriber apparatus is portable.

43. The remote caller identification system of claim 41 wherein the ring signal includes the caller's telephonic address.

* * * * *